United States Patent [19]

Oldham et al.

[11] 3,883,427
[45] May 13, 1975

[54] FLOATING SOLIDS RETURN DEVICE

[75] Inventors: Robert R. Oldham; John H. Wooddell, both of Sidney, Ohio

[73] Assignee: Robert R. Oldham, Inc., Sidney, Ohio

[22] Filed: Mar. 28, 1974

[21] Appl. No.: 455,642

Related U.S. Application Data

[63] Continuation-in-part of Ser. No. 351,274, April 16, 1973, abandoned, which is a continuation-in-part of Ser. No. 239,887, March 31, 1972, Pat. No. 3,805,957.

[52] U.S. Cl.................................. 210/73; 210/195
[51] Int. Cl.............................................. C02c 1/12
[58] Field of Search.............. 210/3, 14, 15, 73, 83, 210/195, 219–221, 525, 538, 540

[56] References Cited
UNITED STATES PATENTS

| | | | |
|---|---|---|---|
| 2,852,140 | 9/1958 | MacLaren | 210/221 |
| 3,195,727 | 7/1965 | Kibbee | 210/195 |
| 3,415,378 | 12/1968 | Fukuda | 210/195 X |
| 3,507,393 | 4/1970 | Weis et al. | 210/195 |
| 3,607,737 | 9/1971 | Garner | 210/195 X |
| 3,618,779 | 11/1971 | Goodman | 210/195 |

*Primary Examiner*—Samih N. Zaharna
*Assistant Examiner*—Robert H. Spitzer
*Attorney, Agent, or Firm*—Cain and Lobo

[57] ABSTRACT

A sewage treatment system in which liquid sewage, containing solids, is conducted into a first or primary settling tank. Liquid is drawn from an intermediate depth of the first tank and conducted to a reducing tank containing an aerator which is operated on a periodic basis and induces a current pattern into the fluid in the reducing tank. A final or outflow settling tank adjacent the reducing tank includes a wall in common with the reducing tank under which settled solids return to the reducing tank. A floating solids return is also provided between the outflow and reducing tanks, and includes a provision for utilizing the current flow induced into the reducing tank by the aerator to educt floating solids from the outflow settling tank into the reducing tank. The floating solids return has an opening in the reducing tank which faces in the same direction toward which the current, induced by the aerator, flows. The effluent is drawn from an intermediate depth of the outflow settling tank.

1 Claim, 3 Drawing Figures

3,883,427

FLOATING SOLIDS RETURN DEVICE

CROSS-REFERENCE TO RELATED APPLICATIONS

This application is a continuation-in-part of applicants' co-pending application, Ser. No. 351,274, filed Apr. 16, 1973, now abandoned, which, in turn, was a continuation-in-part of applicants' then co-pending application, Ser. No. 239,887 filed Mar. 31, 1972, now U.S. Pat. No. 3,805,957.

BACKGROUND OF THE INVENTION

1. Field of the Invention

This invention relates to improvements in sewage treatment systems, and, more particularly, to improvements in sewage treatment systems of the type in which a clear effluent is obtained from sewage reducing and settling tanks.

2. Description of the Prior Art

In locations not served by municipal sewage systems, septic tanks, settling systems and other small scale sewage treatment systems are widely used. Separate sewage treatment systems for use, for example, for a house, small apartment complex, or the like, are becoming increasingly popular. Such systems commonly comprise a first settling tank for separating the solid matter from the sewage, a second tank wherein the sewage, both liquid and solid, is exposed to oxygen and decomposed by aerobic action, and a third outflow tank for final separation by settling. Clear effluent flows from the third tank and the settlings in this last tank are returned by gravity to the second tank. Such systems usually include aeration means, such as a diffuser, in the reducing tank to introduce air into the tank to hasten the aerobic reduction of the sewage. The aerator establishes a current flow pattern in the fluid in the reducing tank. This current flow will vary from tank to tank (installation to installation) even though the tanks are structurally similar and installed and leveled in the same manner.

It has been found, however, that the sewage in the final settling tank ordinarily separates into two solid components, one of which is heavier than the liquid and settles to the bottom of the tank, and the other of which is lighter than the liquid and floats on the surface thereof. Ordinarily, in systems such as described above, a return is provided at the bottom of the final settling tank, such as a sloping wall, or the like, to direct the settled solids back to the bottom of the reducing tank. Additionally, returns have been provided or suggested between the surfaces of the fluids in the outflow or final settling and reducing tanks to facilitate return of the floating solids from the final settling tank to the reducing tank. Such floating solid returns have included means by which the circulating water or fluid in the reducing tank could aid in returning the floating solids from the final settling tank.

One way of doing this is shown in U.S. Pat. No. 3,195,727 issued July 20, 1965 to Kibbee. The structure includes a straight eductor pipe or tube extending between and opening into both the reducing and settling tank at the level of the surface of the liquid therein. A deflector, or the like, is supported on the pipe in the reducing tank and lies in spaced relation with the pipe opening. The deflector faces into the fluid flow path in the reducing tank and, since it covers but does not close the pipe, creates a Bernoulli effect when the aerator is operating and current is flowing in the reducing tank to draw fluid and floating solids through the pipe from the settling tank into the reducing tank.

When the aerator is discontinued, the current in the fluid slowly subsides and, as it does, the floating solids in the reducing tank tend to flow into and along the straight eductor pipe to the final settling tank where such solids are, of course, unwanted. In addition, such devices have not attained the efficiency and effectiveness in overall performance desired and anticipated for them.

SUMMARY OF THE INVENTION

It is, therefore, a general object of this invention to provide a new and improved sewage treatment system for small and private installations.

It is another general object of the invention to provide a new and improved floating solids return device which inhibits the flow of floating solids from flowing from a sewage reduction tank into a sewage settling and outflow tank.

It is a still further object of this invention to provide new and improved means for returning floating solids from a settling to a reducing or treatment tank, which is effective in returning the solids, but doesn't create flow rates of such capacity as to otherwise interfere with normal settling operations; which does not materially affect the usual quiescence in the settling tank; which inhibits the flow of floating solids from the treatment tank to the settling tank; which is economically manufactured and used; which is substantially foolproof in operation; which utilizes gravity and flow cycles otherwise existing in the treatment tank for operation of the floating solids return means; which does not require that the floating solids be displaced or cycled downwardly until after they are returned to the treatment tank; and which obtains one or more of the objects and advantages set forth herein.

These and other objects, features, and advantages of this invention will become apparent to those skilled in the art from the following description of preferred forms thereof, reference being had to the accompanying drawing.

BRIEF DESCRIPTION OF THE DRAWING

The invention is illustrated in the accompanying drawing, wherein.

In the Figures of the drawing, like reference numerals are used to denote like parts.

DESCRIPTION OF THE PREFERRED EMBODIMENTS

Briefly a sewage treatment system and floating solids return device embodying this invention includes an initial sewage settling tank from which the liquid or fluid flows from an intermediate depth into an adjacent reducing or treatment tank or chamber. A final or outflow settling tank is disposed adjacent the reducing tank and is provided with a sloping wall to return settled solid sewage through an opening in a common wall to the bottom of the reducing tank.

A floating solids return provides communication from the surface of the fluid in the final settling tank to the reducing tank. The floating solids return is a pipe or tube having a non-linear shape, and providing surface level return of floating solids from the final settling tank to the reducing tank. Aerating means is also provided at the bottom of the reducing tank for introducing air into the reducing tank. The rising air establishes a fluid flow path or circulation in the tank. The tube opening in the reducing tank faces in the direction of fluid flow adjacent thereto and thus the current flow in the reducing tank is utilized to induce a surface level current flow from the settling tank into the reducing tank to return floating solids from the settling tank into the reducing tank. The air also provides oxygen for aiding the sewage treatment process in the reducing tank.

Figure 1:
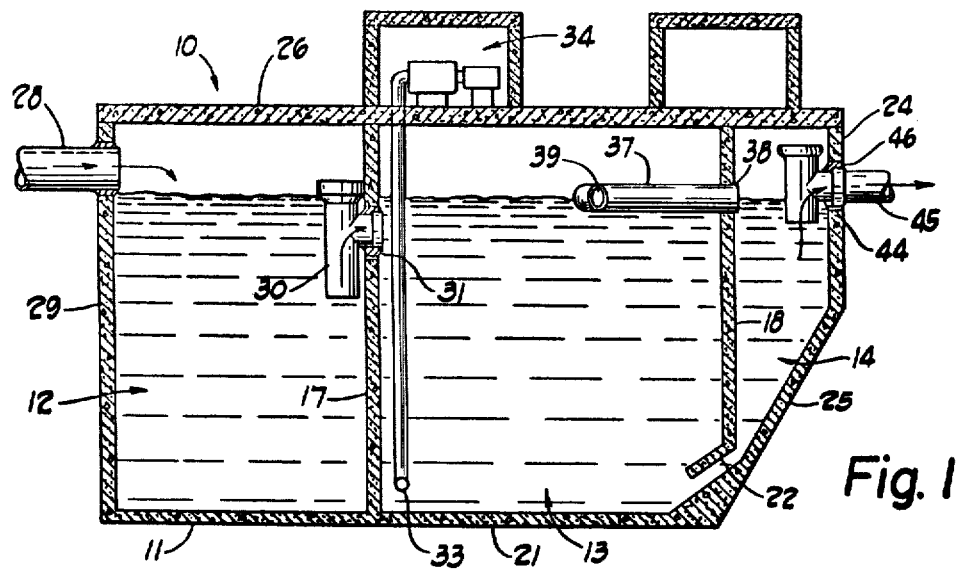
FIG. 1 is a vertical sectional view of a sewage treatment system including a floating solids return device, both of which embody this invention.
Figure 2:
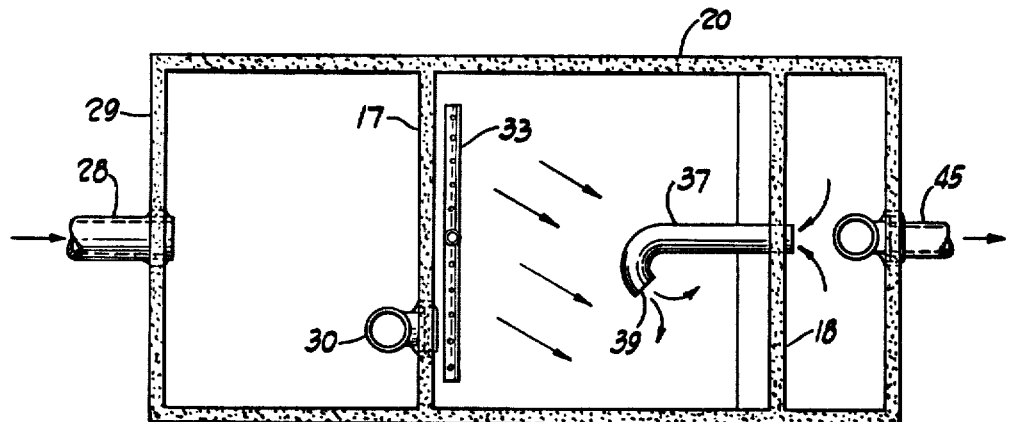
FIG. 2 is a top plan view of the sewage treatment system and device of FIG. 1 with the top or cover removed.

More particularly, as shown in FIGS. 1 and 2 of the accompanying drawing, a sewage treatment system embodying this invention is indicated generally at 10 and includes an overall container 11 which is divided into three tanks, chambers, or basins, a first, initial or input settling tank 12, a reducing or treatment tank 13, and a final or outflow settling tank 14. The input settling tank 12 and the reducing tank 13 are separated by a wall or partition 17 extending to the bottom and sides of the overall container 11, and formed, conveniently, as a unitary part of the container 11. The reducing tank 13 and the final settling tank 14 are separated by a wall or partition 18 extending to the vertical side walls 19 and 20 of the container 11 (see FIG. 2), but preferably does not join the bottom 21 of the container 11 (FIG. 1) to provide a settled sewage or sludge return or opening 22 thereunder, to and for the purposes to be hereinafter more fully discussed.

The partition 18 may be and preferably is separately inserted into the container 11, as by tongue and groove joints, as shown, in FIG. 2, butt joints or other connection.

To facilitate the return of the settled solids from the final settling tank 14 to the bottom of the reducing tank 13, under the partition 18, the end wall 24 of the container 11 preferably has a portion 25 fabricated at an angle, as illustrated in FIG. 1, to provide a sloping or inclined surface to guide the settled solids back into reducing tank 13.

A cover 26 is provided for container 11 to enclose, but provide necessary access to, the three tanks, as shown in FIG. 1. The various walls, partitions, and cover of the system may conveniently be formed of cement, as shown, or of a metal, such as steel, or the like. The primary consideration is, of course, the ability to resist attack by the elements (fluids and solids) contained therein.

A sewage input pipe or tile 28 is provided in the wall 29 of the container 11 at a level just above the surface level of the fluid within the input settling tank 12, whereby sewage flows into the settling tank 12 as indicated by the arrow at the left of FIG. 1. Within the tank 12, the sewage divides or separates naturally into a light floating component and foam, and a heavy settling or sinking component, leaving the center of the fluid relatively, but not completely, clear.

It should be pointed out that the input settling tank 12 is illustrated herein to demonstrate an initial sewage clarification technique and apparatus. In some applications, however, the input sewage may be directed initially into the reduction tank 13, described below in detail.

A pipe 30 is provided to conduct fluid from an intermediate depth of the tank 12 into the reducing or treatment tank 13, as indicated by the arrow to the right of tank 12 in FIG. 1, through a hole 31 cast or otherwise formed in the separating wall 17.

Within the reducing tank 13, an aerator pipe 33 is provided near the bottom of the tank. The aerator pipe 33 may be connected to an air pump, indicated generally at 34, carried, perhaps, on the cover 26, and may be of "T" shape to uniformly distribute air across the fluid in the tank 13. The air which is released into the reducing tank 13 rises in the fluid contained within the tank thereby contacting the sewage and contents of the tank to aid in chemically and biologically reducing and-/or oxidizing the sewage to ash and other non-deleterious substances, in accordance with well-known principles. The rising air also establishes a current or flow within the fluid in tank 13, as shown by the circulation-indicating arrows within the said tank in FIG. 2. Again, both floating and heavy solids settle in the reducing tank 13, ideally in lesser amount than in the input settling tank 12.

From the reducing tank 13, the fluid flows into the final or outflow settling tank 14. By the time the fluid reaches tank 14, most of the floating (light) and settling (heavy) solids have been removed. However, a small portion of each is carried over into the tank 14. The heavy solids in tank 14 settle onto the inclined portion 25 of the end wall 24 and are directed thereby and through the action and effect of gravity back into the reducing tank 13.

The floating solids in the tank 14 are returned via return pipe or tube 37 through a hole 38 in the partition 18. The pipe 37 is disposed at a level such that the fluid partially fills the pipe along its horizontal axis when the tanks are filled to their normal level. Further, pipe 37 is configured in a "J" or other shaped pattern so that the opening or outlet 39 in tank 13 of the pipe 37 opens in the same direction as the direction of flow of the current adjacent thereto in the tank 13 when the aerator 33 is operating.

More particularly, the fluid in the reducing tank 13 sweeps by the opening 39 when the induced current is flowing and, thereby, draws the fluid therewithin and the fluid at and near the surface within the settling tank 14 and entrapped floating solids back into the reducing tank 13. Thus, the floating solids within the output tank 14 are effectively returned or educted to and into the reducing tank 13 to be further treated and reduced to a non-noxious form.

Note, if the current at the surface in tank 13 were a lateral instead of a fore and aft current, the opening 39 would open laterally. Likewise, if the current were counterclockwise, instead of clockwise as viewed in FIG. 1, the opening 39 would face toward tank 12.

In practice, the direction of the major current flow in the tank 13 will vary from installation to installation even though the aerator extend transversely of the tank 13 as shown in the drawings, even though the containers 11 be as uniform as practical when produced under known manufacturing techniques, and even though the containers 11 be carefully leveled upon installation.

Further, there are frequently cross-and-eddy currents of lesser magnitude in the tank 13 in addition to the major current flow.

Accordingly, as suggested above, the opening 39 in return pipe 37 is cut so that when installation is made, the opening 39 faces, as noted, in the direction of major current flow in the surface adjacent thereto.

Thus, as shown in FIG. 2, when the major current flow is at an angle of about 45° across the tank 13 from the upper left to the lower right as viewed, the pipe 37 is cut transversely of its axis at that point along the curve of the "J", as shown, which will ensure that the opening 13 faces in the direction of the said current flow.

Figure 3:
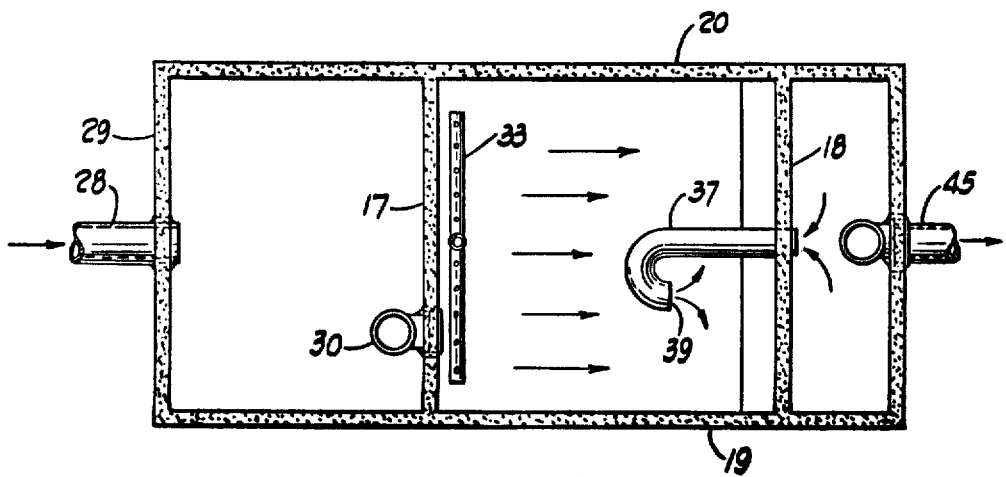
FIG. 3 is a view, similar to FIG. 2, of a modified sewage treatment system and device embodying this invention.

Further, as shown in FIG. 3, when the major current is in a direction parallel with the longitudinal axis of the container 11 the pipe 37 is formed with a complete "J" shape and the opening 39 faces toward, instead of at a 45° angle with, the wall or partition 18.

Obviously, the pipe 37 may have its opening facing at any other angle relative to wall 18 in order to effect the purpose and teaching of this invention that the opening face in the direction of major current flow adjacent thereto at the surface within the tank 13.

The current is created when the aerator 33 is operated automatically by a timer. Normally, the aerator 33 is operated on a cyclic basis, so many minutes per hour, depending on the nature of the sewage being treated and the amount of oxygen needed to treat the same effectively.

When the aerator is operated cyclically, the momentum of the current will continue for some time after the aerator is turned off with the flow and force thereof decreasing slowly to zero. This residual flow tends to prevent solids in tank 13 from flowing through the return pipe 37 into tank 14 so long as the same continues. Further, cycles of aerator operation, usually or normally about ten minutes or so in each hours, or are such duration that it is unlikely that solids will effect a random movement from tank 13 through the entire length of pipe 37 into tank 14 during the period of quiescence between adjacent cycles.

Further, even if some floating solids did by random movement, reach tank 14 during the period of quiescence, such solids would no more effect the effluent from container 11 and tank 14 than would the floating solids reaching tank 14 through the opening 22, or otherwise, during normal flow of fluid through the container 11.

This is because effluent or outflow pipe 44, which is provided to conduct the purified and clarified effluent from the system 10, opens at an intermediate depth in the fluid in the settling tank 14. Pipe 44 connects in turn with a pipe or tile 45, which leads through a hole 46 in the wall 24 at the normal fluid level. Of course, the flow of solids from tank 14 into tank 13 is much greater than the other way because the eductor of this invention induces such flow positively by utilizing the current flow in tank 13 to cause movement of fluid from tank 14 through pipe 37, out opening 39, which faces into the direction of current flow, adjacent thereto and then, in the current flow, to the reaches of tank 13.

Modifications, changes, and improvements to the preferred forms of the invention herein disclosed, described, and illustrated may occur to those skilled in the art who come to understand the principles and precepts thereof. Accordingly, the scope of the patent to be issued hereon should not be limited to the particular embodiments of the invention set forth herein, but rather should be limited by the advance by which the invention has promoted the art.

We claim:

1. A process for returning floating solids from a first portion of a tank, having fluid therein and divided into two portions by partition means, to the second portion wherein a current, the major portion of which is in a determinable direction, is induced, said process comprising the steps of providing conduit means at the surface of the fluid, said conduit means being substantially "J-shaped" with a longitudinal axis and having a first opening at one end extending transversely of said axis and communicating with the surface of said fluid in said first portion of said tank, a curved or reentrant portion, and a second opening extending transversely of said axis, nearer said curved or reentrant portion than said first opening, and opening into said second portion of said tank and being in communication with the surface of the fluid therein, determining the direction of flow of the major portion of the current in said second portion of said tank at the surface of fluid therein adjacent said second opening, and cutting or severing said conduit means transversely of said axis along said curved or reentrant portion thereof to face said opening in the direction in which said major portion of said current is determined to be flowing.

* * * * *